(12) United States Patent
Ghosh et al.

(10) Patent No.: US 9,058,443 B2
(45) Date of Patent: *Jun. 16, 2015

(54) PLANNING ECONOMIC ENERGY DISPATCH IN ELECTRICAL GRID UNDER UNCERTAINTY

(71) Applicant: International Business Machines Corporation, Armonk, NY (US)

(72) Inventors: Soumyadip Ghosh, Peekskill, NY (US); Dung T. Phan, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 13/632,705

(22) Filed: Oct. 1, 2012

(65) Prior Publication Data

US 2014/0025351 A1 Jan. 23, 2014

Related U.S. Application Data

(60) Provisional application No. 61/672,476, filed on Jul. 17, 2012.

(51) Int. Cl.
*G06G 7/54* (2006.01)
*G05B 13/02* (2006.01)
(Continued)

(52) U.S. Cl.
CPC ........ *G06F 17/5009* (2013.01); *G06F 17/5004* (2013.01); *G06F 17/509* (2013.01); *G06F 2217/78* (2013.01); *Y04S 10/545* (2013.01);
(Continued)

(58) Field of Classification Search
CPC . G06F 17/5009; G06F 2217/78; Y02E 40/76; Y02E 60/76; H02J 3/14

USPC .......... 703/18; 700/28, 33, 36, 295
See application file for complete search history.

(56) References Cited

U.S. PATENT DOCUMENTS 6,021,402 A * 2/2000 Takriti .................. 705/412
7,117,070 B2 * 10/2006 Chow et al. ............ 700/297

OTHER PUBLICATIONS

Wang et al. (Chance-constrained two stage stochastic program for unit commitment under uncertain wind power output, 2011, 10 pages).*

(Continued)

*Primary Examiner* — Kamini S Shah
*Assistant Examiner* — Andre Pierre Louis
(74) *Attorney, Agent, or Firm* — Scully, Scott, Murphy & Presser, P.C.; Daniel P. Morris, Esq.

(57) ABSTRACT

A system and computer program product for solving a two-stage non-linear stochastic formulation for the economic dispatch problem under renewable-generation uncertainty. Certain generation decisions are made only in the first stage and fixed for the subsequent (second) stage, where the actual renewable generation is realized. The uncertainty in renewable output is captured by a finite number of scenarios. Any resulting supply-demand mis-match must then be alleviated using high marginal-cost power sources that can be tapped in short time frames. The solution implements two outer approximation algorithms to solve this nonconvex optimization problem to optimality. Under certain conditions the sequence of optimal solutions obtained under both alternatives has a limit point that is a globally-optimal solution to the original two-stage nonconvex program. A further decomposition approach derived from the Alternating Direction Method of Multipliers algorithm is implemented.

18 Claims, 10 Drawing Sheets

(51) Int. Cl.
*G05D 3/12* (2006.01)
*G06F 17/50* (2006.01)

(52) U.S. Cl.
CPC . *Y04S40/22* (2013.01); *Y02E 40/76* (2013.01); *Y02E 60/76* (2013.01)

(56) References Cited

OTHER PUBLICATIONS

Yong et al., "Reserve Determination for System with Large Wind Generation", IEEE Power & Energy Society General Meeting, 2009, PES'09, pp. 1-7, downloaded on May 26, 2010 from IEEE Xplore.

Zavala, "Optimization Challenges in Energy Systems", U.S.-Mexico Workshop on Optimization and its Applications, Jan. 3, 2011, http://www.mcs.anl.gov/~vzavaka.oaxaca_2011.pdf.

Ghosh et al., "Integration of Demand Response and Renewable Resources for Power Generation Management", In Proceedings of First IEEE Power & Energy Society ISGT Meeting, 2011.

Wu et al., "Economic Dispatch Including Wind Power Injection", In Proceedings of ISES World Congress 2007, pp. 2343-2347.

Schellenberg et al., "Cumulant Based Stochastic Optimal Power Flow (S-OPF) for Variance Optimization", IEEE Power Engineering Society General Meeting 2005, pp. 473-478.

\* cited by examiner

50

OUTER APPROXIMATION ALGORITHM 1

1. SET $\eta^{n,1} = 0 \forall n = 1, ..., N$. SOLVE THE FOLLOWING TO GET $g^1$ ← 51

$$\min f(g) \quad \text{s.t.} \quad (g, v^0, s^0) \in \Omega$$

2. FOR $k = 1, 2, ...$
   (A) FOR EACH $n = 1, ..., N$:

SOLVE THE SUBPROBLEM ($S^n$) ASSOCIATED WITH $g^k$ TO GET THE OPTIMAL VALUE $w^n(g^k)$ AND A SUBGRADIENT $\pi^{n,k}$.

(B) TERMINATE THE ALGORITHM IF $\sum_n P^n \eta^{n,k} = \sum_n P^n w^n(g^k)$.

(C) SOLVE THE $k$-th LOWER-APPROXIMATION ($M^k$) TO THE MASTER PROBLEM TO OBTAIN AN OPTIMAL SOLUTION $g^{k+1}$ AND AN AUGMENTED LOWER APPROXIMATION $\eta^{n,k+1}$.

OUTER APPROXIMATION ALGORITHM 2

1. SET $\eta^1 = 0 \forall n = 1,\ldots,N$. SOLVE THE FOLLOWING TO GET $g^1$ ⤴ 151

$$\min \ f(g) \quad \text{s.t.} \quad (g, v^0, s^0) \in \Omega.$$

2. FOR $k = 1, 2, \ldots$
  (A) FOR $n = 1, \ldots, N$:
  SOLVE THE SUBPROBLEM $(S^n)$ ASSOCIATED WITH $g^k$ TO GET THE OPTIMAL VALUE $w^n(g^k)$ AND A SUBGRADIENT $\pi^{n,k}$.
  (B) TERMINATE THE ALGORITHM IF $\eta^k = \sum_n P^n w^n(g^k)$.
  (C) SOLVE THE $k$-th LOWER-APPROXIMATION MASTER PROBLEM $(M^k)$ TO OBTAIN AN OPTIMAL SOLUTION $g^{k+1}$ AND $\eta^{k+1}$.

ADMM ALGORITHM 250

1. INITIALIZE $g^{n,0}, \lambda^{n,0}, n = 1,...,N$  ← 251

2. FOR $k = 1, 2, ...$ (A) SET $(g^{0,k}, \upsilon^{0,k}, s^{0,k}) =$ $\operatorname{argmin} f(g) + C(s) + \Sigma_{n=1}^{N}((\lambda^{n,k-1})^T(g - g^{n,k-1}) + \frac{\beta}{2}\|g - g^{n,k-1}\|^2)$
  s.t. $(g, \upsilon, s)$ obey (14) for $n = 0$ (B) FOR $n = 1,..., N$:

$(g^{n,k}, \upsilon^{n,k}, s^{n,k}) = \operatorname{argmin} p^n C(s) + (\lambda^{n,k-1})^T(g^{0,k} - g) + \frac{\beta}{2}\|g^{0,k} - g\|^2$
                         s.t. $(g, \upsilon, s)$ obey (14) for $n$ (C) SET $\lambda^{n,k} = \lambda^{n,k-1} + \beta(g^{n,k} - g^{0,k})$ (D) TERMINATE IF $\|g^{n,k+1} - g^{0,k+1}\| \le \epsilon$ and $\|g^{n,k+1} - g^{n,k}\| \le \epsilon, n = 1,...,N.$

| TEST SYSTEM | BUSES | GENERATORS | LINES | WIND GENERATORS | EXPORT | IMPORT |
|---|---|---|---|---|---|---|
| CH9 | 9 | 3 | 9 | 4,6 | 5 | 2,3 |
| IEEE14 | 14 | 5 | 20 | 4,6 | 5 | 2,3 |
| IEEE30 | 30 | 6 | 41 | 4,6 | 5 | 2,3 |
| NE39 | 39 | 10 | 46 | 4,6 | 5 | 2,3 |
| IEEE57 | 57 | 7 | 80 | 5,45 | 7 | 3,4 |
| IEEE118 | 118 | 54 | 186 | 89,100 | 60,75 | 25,65 |
| IEEE300 | 300 | 69 | 411 | 89,100 | 60,75 | 2,89,150 |

| TEST SYSTEM | EXPECTED COST | GEN. COST | ALGORITHM 1 | | ALGORITHM 2 | | ADMM | |
|---|---|---|---|---|---|---|---|---|
| | | | ITER | TIME | ITER | TIME | ITER | TIME |
| CH9 | 2142.9 | 2092.8 | 2 | 0.41 | 2 | 0.42 | 28 | 2.53 |
| IEEE14 | 5735.4 | 5776.3 | 2 | 0.47 | 2 | 0.45 | 35 | 3.72 |
| IEEE30 | 6284.1 | 6198.7 | 4 | 1.62 | 4 | 1.44 | 44 | 10.07 |
| NE39 | 32465.4 | 32504.5 | 2 | 0.85 | 2 | 0.76 | 61 | 13.64 |
| IEEE57 | 38306.6 | 38212.6 | 5 | 0.45 | 7 | 0.65 | 20 | 5.81 |
| IEEE118 | 128576.7 | 128451.8 | 4 | 3.70 | 4 | 3.22 | 17 | 15.84 |
| IEEE300 | 715032.6 | 714958.2 | 3 | 5.66 | 3 | 4.84 | 29 | 34.07 |

Final results:
Total expected cost: 1890.30
Current gen. cost : 1872.86
Total CPU time : 0.29
================================

Generation planning:  ⎫
Gen   Pg      Qg       ⎬ 460
 1   52.59  -11.08    ⎭
 2   88.74   -3.67
 3   61.81  -56.01

Exchanging powers with the spot market:

Scenario 1:                    ⎫
Import: bus   Pg     Qg       ⎪
         2   6.28  -0.25       ⎬ 475
         3   5.51  -1.56       ⎪
Export: bus   Pg     Qg        ⎪
         5   0.00  -0.87      ⎭

Scenario 2:                    ⎫
Import: bus   Pg     Qg       ⎪
         2   0.00  -0.56       ⎬ 480
         3   0.00   3.22       ⎪
Export: bus   Pg     Qg        ⎪
         5  17.34  -3.39      ⎭

Scenario 3:
Import: bus   Pg     Qg
         2   0.00  -0.67
         3   0.00  -4.07
Export: bus   Pg     Qg
         5   1.45   1.67

Scenario 4:
Import: bus   Pg     Qg
         2   0.00  -0.08
         3   0.00  -3.59
Export: bus   Pg     Qg
         5   0.31  -4.59

Scenario 5:
Import: bus   Pg     Qg
         2   0.54  -0.59
         3   0.23  -5.76
Export: bus   Pg     Qg
         5   0.00   0.77

Scenario 6:
Import: bus   Pg     Qg
         2   4.83  -0.66
         3   4.20  -1.19
Export: bus   Pg     Qg
         5   0.00   4.17

Scenario 7:
Import: bus   Pg     Qg
         2   0.00   0.37
         3   0.00  -2.72
Export: bus   Pg     Qg
         5   9.02  -5.78

Scenario 8:
Import: bus   Pg     Qg
         2   0.00  -0.70
         3   0.00  -3.03
Export: bus   Pg     Qg
         5   3.24  -0.95

Scenario 9:
Import: bus   Pg     Qg
         2   3.61  -0.12
         3   3.09   0.71
Export: bus   Pg     Qg
         5   0.00  -3.22

Scenario 10:
Import: bus   Pg     Qg
         2   0.00   0.00
         3   0.00   0.00
Export: bus   Pg     Qg
         5   0.00   0.00
================================

FIG. 10

PLANNING ECONOMIC ENERGY DISPATCH IN ELECTRICAL GRID UNDER UNCERTAINTY

CROSS REFERENCE TO RELATED APPLICATION

This application relates to and claims the benefit of the filing date of provisional U.S. Patent Application Ser. No. 61/672,476, filed Jul. 17, 2012 the entire content and disclosure of which is incorporated herein by reference.

BACKGROUND

The present invention generally relates to systems and methods for power generation management, and more particularly, a method and system for determining a generator dispatch plan for electrical networks which achieves the lowest total expected costs to meet the demand under uncertainty on the demand and/or generation.

Modeling uncertainty in dispatching energy is becoming more critical as renewable energy technologies play an increasing role in the portfolio mix of electricity generation.

FIG. 1 provides an illustration. The power flow between each pair of nodes obeys certain non-linear equations that arise out of Kirchhoff's law. An economic dispatch (ED) problem or optimal power flow (OPF) problem is said to have been solved when the dispatch and transmission decisions are taken to minimize the total cost of generation. A linearized version of the alternate current (AC) power flow equations, called the direct current (DC) power flow equations, can be used to gain tractability at the expense of optimality.

Forecasting near-term wind availability and velocity is an imperfect science. Assessing study how wind power production can be integrated into existing dispatch models, and analyze the impact of uncertainty of forecast errors for wind power production on incremental reserve requirements and imbalance costs.

Entities in charge of smooth operation of the electrical grid require that this uncertainty associated with utilizing renewable sources such as wind power must be hedged. Various approaches have been proposed to tackle this: for example, presenting a balancing algorithm to achieve overall dispatchability in a distributed generation network by actively managing a group of small distributed generations to convert them into one large more controllable logical generation station.

Non-linear power balance is a routine operational constraint for energy transmission and distribution companies, and ability to incorporate uncertainty could provide large cost savings in introducing intermittent sources of supply like renewables.

Such problems are generally formulated as a very large-scale nonlinear, nonconvex optimization problem, which requires a solution in near real-time. The existing methods have problems with handling the non-linear, non-convex issue and uncertainty. They are often only able to solve for linearized approximation formulations or use the sampling-based algorithms for the nonlinear one, whose identified solutions have no guarantees on optimality.

It would be highly desirable to provide a system and method for balancing energy provided by non-dispatchable sources (such as wind and photovoltaic units) with quickly dispatchable, sources (such as small hydro and micro turbine units).

SUMMARY

A system, method and computer program product for solving a two-stage non-linear stochastic formulation for the economic dispatch problem under renewable-generation uncertainty. Certain generation decisions are made only in the first stage and fixed for the subsequent (second) stage, where the actual renewable generation is realized. The uncertainty in renewable output is captured by a finite number of scenarios. Any resulting supply-demand mis-match may then be alleviated using high marginal-cost power sources that can be tapped in short time frames. The solution implements two outer approximation algorithms to solve this nonconvex optimization problem to optimality.

Under certain conditions the sequence of optimal solutions obtained under both alternatives has a limit point that is a globally-optimal solution to the original two-stage nonconvex program.

A further decomposition approach derived from the Alternating Direction Method of Multipliers algorithm (ADMM) is implemented.

The system, method and computer program product implements processes for deciding how the active generators are dispatched, which involves setting the power output level of the bulk generators (power is the rate at which energy is produced), and how the produced energy is routed through the grid to consumption (also called load) nodes.

In one aspect there is provided a system, method and computer program product for determining a generator dispatch plan for a power grid under uncertain conditions. The method comprises: receiving data modeling power flow of active generation units over nodes of a power grid network of multiple local buses interconnected via transmission lines, the active generation units including conventional energy generators producing energy; receiving during a first time interval data of a set of forecast scenario modeling uncertainty in renewable energy output [e.g., wind power] the set capturing a finite number of scenarios generation for an immediately successive $2^{nd}$ time interval; formulating an optimization problem modeling economic dispatch problem under renewable-generation uncertainty; solving optimization problem during the first time interval to obtain power dispatch levels for the generators and energy levels exchanging with a spot market for each scenario at the $2^{nd}$ time interval that minimizes expected cost of power generation and cost of exchanging energy with a spot market modeled for each the modeled uncertainty, wherein one or more processor units in communication with a memory storage device performs the receiving the modeling power flow and uncertainty data, the formulating and solving.

In one embodiment, the optimization problem represents a nonconvex problem capturing renewable-generation uncertainty using the finite number of scenarios.

In one embodiment, the method solves the optimization function to determine: optimal power output levels of the active generators and renewable energy generators, and how the produced energy is routed through the grid to consumption nodes, such that an expected cost for energy generation and spot market is minimized.

A computer program product is provided for performing operations. The computer program product includes a storage medium readable by a processing circuit and storing instructions run by the processing circuit for running a method.

DRAWINGS

The accompanying drawings are included to provide a further understanding of the present disclosure, and are incorporated in and constitute a part of this specification. The drawings illustrate embodiments of the invention and, together with the accompanying description, serve to explain the principles of the invention. In the drawings, FIG. 1 illustrates an example IEEE Standard 30-bus architecture 10 including an entity controlling the dispatching of active generation units over a network of multiple local buses 12 interconnected via transmission lines;

FIG. 2 is a first embodiment of a linear outer approximation algorithm 50 (Outer Approximation Algorithm 1);

Figure 5:
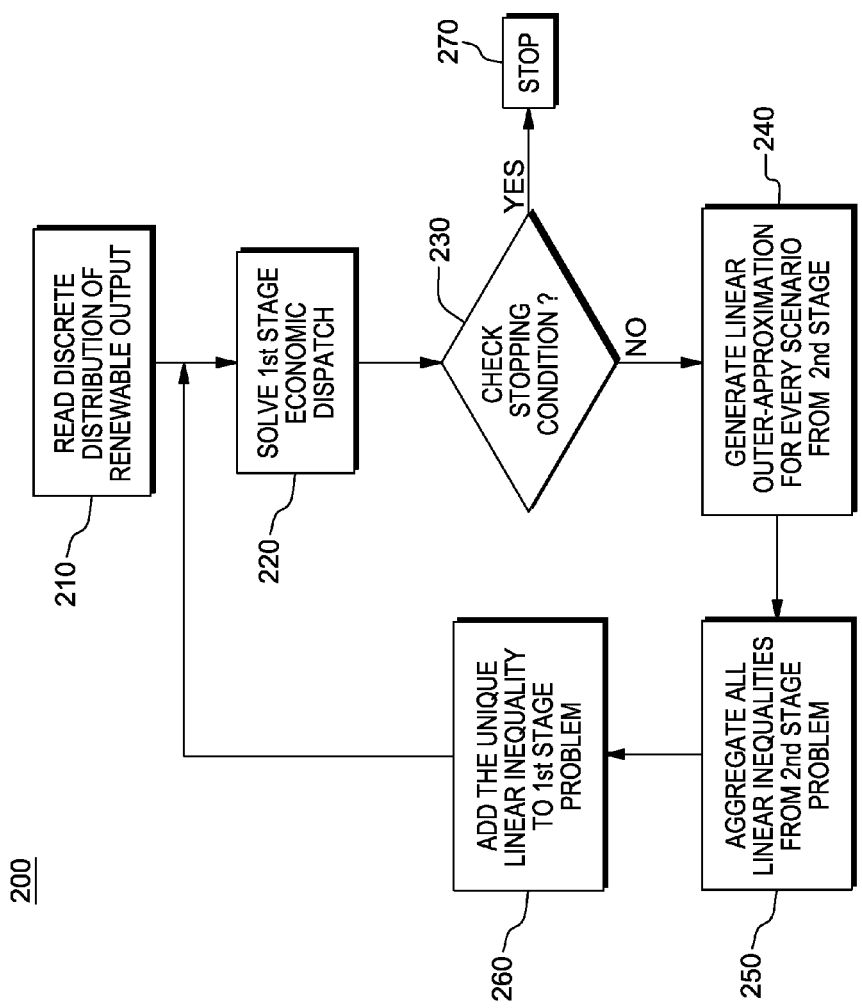

FIG. 4 presents a second embodiment of a linear outer approximation algorithm 150 (Outer Approximation Algorithm 2);

FIG. 5 depicts a flow chart of the second linear outer approximation algorithm 200 (Outer Approximation Algorithm 2) for solving the two-stage nonconvex optimization problem defined by equations (4) and (5) in two stages.

Figure 7:
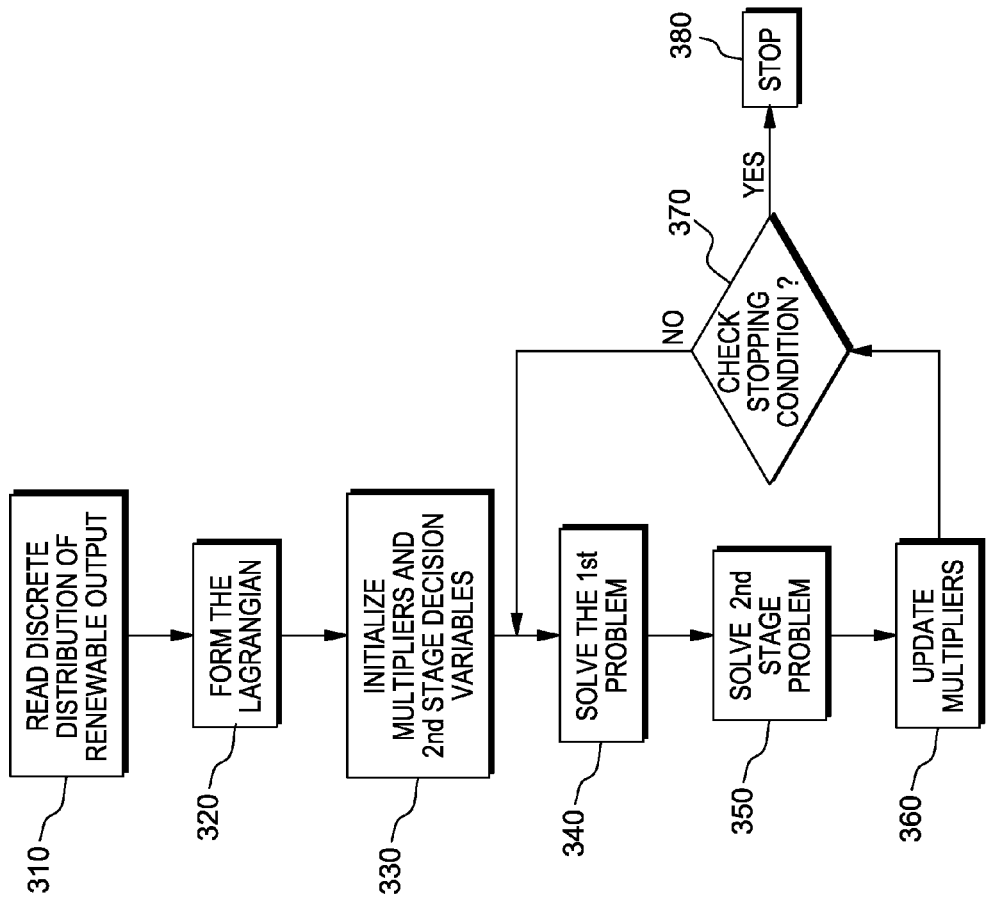
Figure 11:
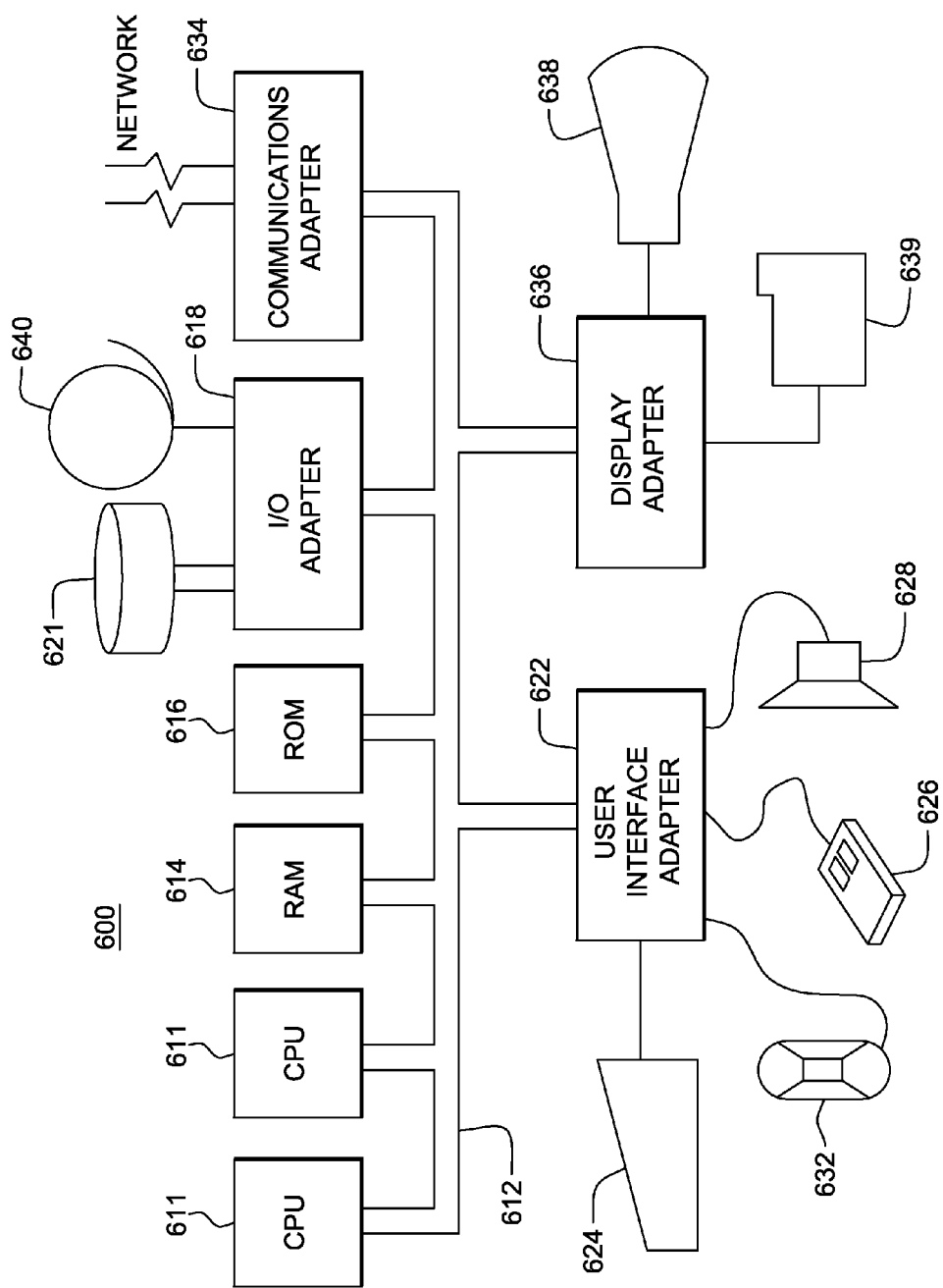

FIG. 6 presents a further embodiment of a linear outer approximation algorithm 250 implementing an ADMM approximation for solving the two-stage nonconvex optimization problem defined by equations (4) and (5);

FIG. 7 depicts a flow chart of the ADMM approximation algorithm 300 for solving the two-stage nonconvex optimization problem defined by equations (4) and (5);

FIG. 8 depicts a Table 400 summarizing results of implementing the algorithms for example test power systems depicted in various bus/grid configurations including characteristics such as the total number of buses and the number of generators in each system;

FIG. 9 depicts a Table 500 showing the performance of each of the algorithms described in the embodiments herein, including CPU time in seconds for each algorithm used to test example power systems of FIG. 8;

FIG. 10 shows an output listing of an example solution 450 of the generation planning and exchange of powers via spot market scenarios for an example CH9 bus configuration; and FIG. 11 illustrates an exemplary hardware configuration to run method steps described in FIGS. 2-7 in one embodiment.

DETAILED DESCRIPTION

A stochastic version of the economic dispatch problem and solution thereof is provided.

In one aspect, a system, method and computer program product for solving economic dispatch for AC power flow under uncertainty in near real time for electrical power systems having a large number of nodes/buses, is provided.

In one aspect, a two-stage stochastic formulation is provided that addresses the wind-generation uncertainty. While wind power generation as the primary motivating example, the system and methods herein apply transparently to all sources of uncertainty, be it in power generation (i.e. supply) or demand.

In one embodiment, energy generation and supply-demand mediation in a power grid is planned for in two steps. The first step takes place in a day-ahead market and decides which bulk generation sources (typically thermal, nuclear and hydro sources) are awarded contracts to supply energy in the next day. This base generation capability is augmented by additional smaller capacity "peaker" thermal generators and external sources of energy (spot markets) to hedge against unplanned excess demand. A second planning stage is at a smaller time-scale, typically, but not limited to, five to fifteen minutes. During this stage, it is decided how the active generators are dispatched, which involves setting the power output level of the bulk generators (power is the rate at which energy is produced), and how the produced energy is routed through the grid to consumption (also called load) nodes. Transmission occurs between multiple buses (network nodes) that are interconnected via electrical transmission lines such as in FIG. 1. Renewable sources like wind generation have negligible operational costs (in the hourly time-scale) and thus is typically the active generator to be dispatched.

In the present disclosure, a renewable energy power source is modeled as a non-dispatchable, intermittent source that is connected in an always-on state to the grid. Current targets for penetration of renewable generation makes the case where the grid is over-supplied from renewables a very remote possibility.

An approach in solving the stochastic formulation is via sample-average approximation (SAA), where the uncertainty is captured using a finite number of scenarios. The approach considers the full non-linear AC power balance equations in each stage of this program. The non-linearity arises from the Kirchoff's law based power transmission equations in each stage, and generally makes the two-stage program nonconvex. Most existing methods in the literature consider the DC power flow approximations, a linearization of the non-linear AC constraints that enables exploiting the powerful decomposition techniques designed for the linear stochastic programs. However, the DC formulation captures the physical power flows less realistically than its AC counterpart, and the full non-convex AC formulation is more desirable. A nonconvex two-stage SAA program is generated to solve the energy dispatch issues for subsequent time periods (next 5-15 minutes in a non-limiting example).

Each stage models dispatching and transmission decisions that are made in subsequent time periods separated by a time interval, e.g., five to fifteen minutes. Certain dispatching decisions cannot be changed in the subsequent step; for example, mechanical stability considerations require that large diesel/coal generators change their generation levels more gradually than the length of the period. So, these decisions are made in the first stage and remain fixed at the second stage. More generally, one may allow these to be varied in a small interval around their first stage values. The second stage realizes the actual renewable energy, e.g., wind generation. Any resulting supply-demand mis-match must then be alleviated using additional high marginal-cost power sources that can be tapped in short order. This second class of generators is collectively referred to as the spot-market, which can include a) thermal "peakers", which are active, quick-response fossil-fuel sources, b) external power sources such as neighboring grids or power aggregators that are willing to supply extra power at "spot market" prices, and c) sources of virtual generation, such as interruptible loads of large commercial users, retail operations or consumer homes that can be influenced to shift or reduce their demand in response to incentives.

The approach to solving the stochastic formulation is via a sample-average approximation (SAA), where the uncertainty is captured using a finite number of scenarios. However, in the system and method, there is considered the full non-linear AC power balance equations in each stage. The non-linearity arises from the Kirchoffs law based power transmission equations in each stage, and generally makes the two-stage program nonconvex.

The method for solving such problems exploits structural properties of the specific formulation. For example, a strong structural property has been shown to exist for the standard economic dispatch problem (i.e. the single stage deterministic ED problem), where one can find candidates local optimal solutions to practical instances of the problem that also often satisfy a zero duality gap condition, thus proving to be globally optimal.

The system, methods and computer program product herein makes use of the property that solutions to particular reformulations exhibit zero duality gap, to provide a decomposition approach to solving this two-stage problem. In the solution described herein:

1) It can be shown that for problem instances that satisfy a zero gap duality check, an effective, consistent decomposition scheme is setup for the two-stage SAA program. The decomposition scheme solves a sequence of lower-approximation problems for the first-stage minimization problem. Each iteration improves a piecewise-linear outer-approximation for the recourse function that represents the second stage costs of the first stage decisions. In particular, this facilitates a parallel implementation of the solution algorithm.
2) Two alternatives for the form of the outer-approximation are implemented. The sequence of optimal solutions obtained under both alternatives has a limit point that is a globally-optimal solution to the original two-stage nonconvex program.
3) The zero-gap condition along with the two approximation approaches to the SAA program also provides a consistency result on the quality of the sample-average approximation estimate of the true stochastic formulation.
4) Further an alternating direction method of multipliers approach to decomposing the SAA problem is provided. Numerical results show that the proposed outer approximation decompositions work an order of magnitude faster than the ADMM approach. This is in line with the fact that ADMM is a general purpose meta-algorithm that places few restrictions on the problem structure.

Figure 1:
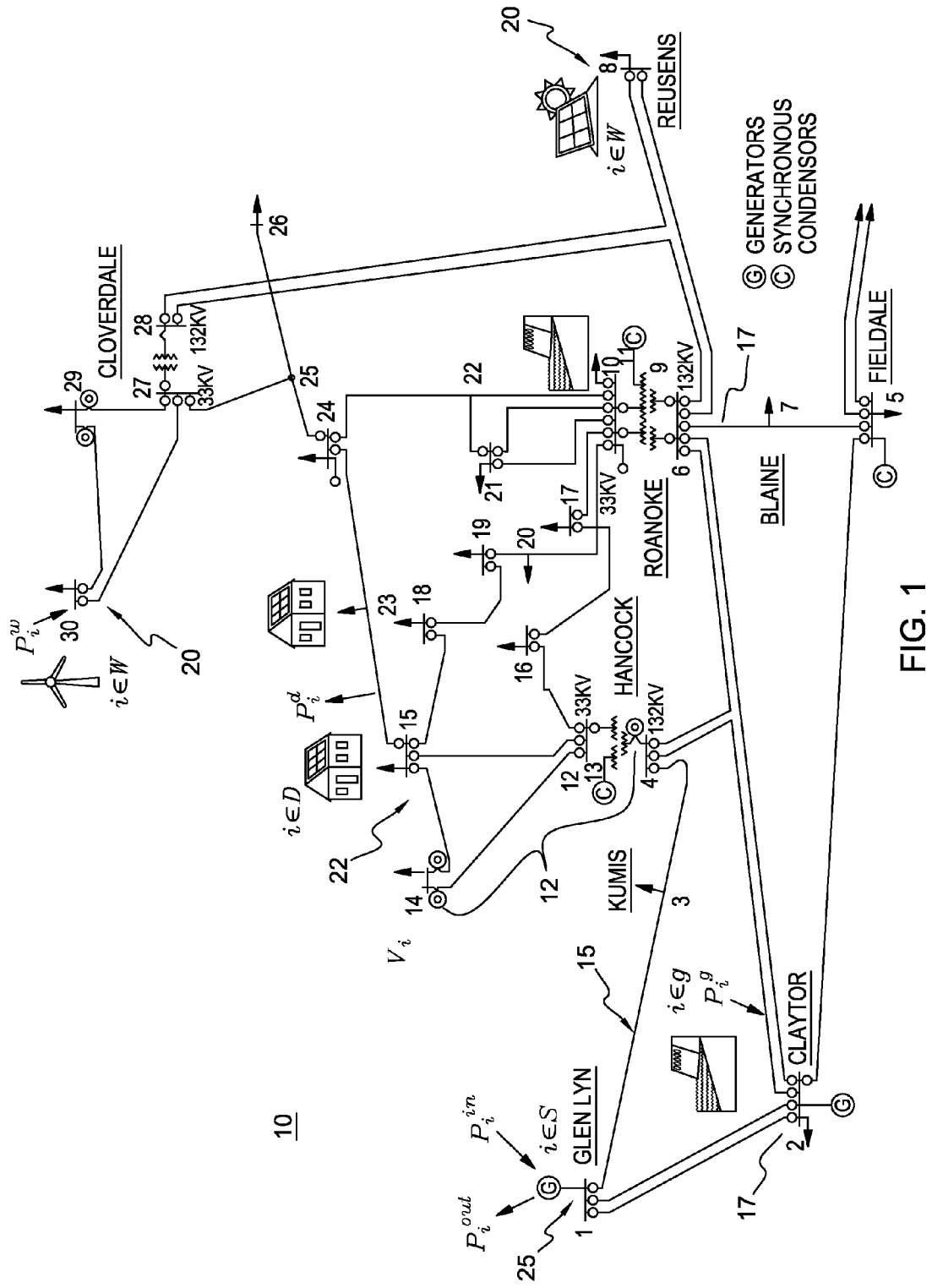

Referring to FIG. 1 depicting an example power grid 10, an electric grid management entity (not shown) controls the dispatching of active generation units over a network of multiple local buses 12 interconnected via transmission lines 15. FIG. 1 provides an illustration of these on a 30-bus example taken from the IEEE standard test suite. As shown, B is defined as the set of all buses, or nodes, in the grid network; G as the set of buses (nodes) 17 that conventional generators connect to; W as the set of wind-generator buses or nodes 20; D as the set of energy demand or load buses or nodes 22; and S as the set of buses (nodes) 25 with access to the spot market. To keep the exposition readable, it is given that the sets G, W, D and S are pairwise disjoint, and $B=G \cup W \cup D \cup S$.

The alternate current nature of electricity supply mandates that power analysis be conducted using complex valued quantities. The real and imaginary parts of power are called the active and reactive power respectively. Power flow over a network of transmission lines that connect all the buses (nodes) is determined by the voltages set at each bus. Let v be the vector of (complex-valued) voltages $v_i$ at all buses $i \in B$. Current flow between any two connected nodes i and j is determined by the voltage difference between them as $I_{ij} = Y_{ij}(v_j - v_i)$, where the admittance $Y_{ij}$ between nodes i and j is a physical characteristic of the network. In short, $I = Y \cdot v$, where Y is the (complex-valued) admittance matrix. Net power flow between nodes and j is then determined from linear transformations of $v \cdot I^*$, where $I^*$ is the complex conjugate of I. Power flow is thus defined by separate sets of equations for the active and reactive parts. Each function is quadratic in the real and imaginary parts of the base transmission variables v, and is nonconvex. This distinction of constraints into real and imaginary sets holds no significance to this description. All complex terms like $v_i$ are thus understood to represent the corresponding real-valued vector $(Re\{v_i\}, Im\{v_i\})$. Let function $L_{ij}(v)$ represent the power flow from node i to node j, and $P_i(v)$ denote the net complex power flow into node $i \in B$. These functions are (nonconvex) quadratic.

In one embodiment, the first stage generation control decisions are the complex power g, extracted from conventional generators $i \in G$. Let functions $f_i(g_i)$ represent the cost of generation. Typically, $f_i$ is only a function of the real part of $g_i$ and convex. The generators are limited to producing within $[\underline{g_i}, \overline{g_i}]$. Let g represent the collection $\{g_i, i \in G\}$ and define by $f(g)$ the total generation cost $\Sigma_G f_i(g_i)$. Demand at node $i \in D$ is represented by $D_i$.

The second stage uncertainty realization $\xi$ observes wind turbine power extraction at level $W_i^\xi$ at bus $i \in W$. Demand could also be allowed to vary at each stage and even with each realization without disturbing any of the approach described herein. The second stage recourse decision variables are the extra power $s_i^\xi$ that may be procured from the spot market at bus $i \in S$, allowing for the possibility that surplus power ($s_i^\xi < 0$) may also be sold to the spot market. The convex functions $C_i(s_i^\xi)$ give the total cost of purchasing from or selling to the spot market under realization $\xi$. Define $s^\xi \triangleq \{s_i^\xi, i \in S\}$ and let $C(s^\xi)$ be the total spot market access cost $\Sigma_{i \in S} C_i(s_i^\xi)$ under realization $\xi$.

Both stages also make power dispatch state decisions by setting the voltages $v_i^0, v_i^\xi$ at each node $i \in B$. Then the following balance equations are implied for all $\xi$:

$$P_i(v^\xi) = \begin{cases} s_i^\xi & \forall i \in S \\ g_i & \forall i \in G \\ W_i^\xi & \forall i \in W \\ -D_i & \forall i \in D. \end{cases} \quad (1)$$

It is noted that the power-flow functions $P_i(\bullet)$ remain the same for all scenarios. Various physical and safety considerations require that the vector of all voltages $|v^\xi| \in [\underline{v}, \overline{v}]$, and the power transmission $L(v^\xi) \triangleq \{L_{ij}(v), i, j \in B\}$ obeys line limits $L(v^\xi) \leq \overline{l}$. The objective of the two-stage optimal power flow problem is to minimize, over the variables $g$, $v^\xi$ and $s^\xi$, the total aggregated expected costs:

$$\min_{g, v^\xi, s^\xi} f(g) + E_\xi[C(s^\xi)] \quad (2)$$

$$s.t. \text{ power flow balance constraints (1) for the} \quad (3)$$
first stage and all second stage realizations $\xi$, $$L_{ij}(v^\xi) \leq \overline{l_{ij}} \quad \forall i, j \in B, \xi$$

$$\underline{g_i} \leq g_i \leq \overline{g_i} \quad \forall i \in G$$

$$\underline{v_i} \leq |v_i^\xi| \leq \overline{v_i} \quad \forall i \in B, \xi.$$

In practice, additional physical and operational constraints can be imposed and the solution approaches described below are still valid.

In solution, the random realization $\xi$ is allowed to have a continuous distribution. In what follows, a first study the Sample-Average Approximation (SAA) of this problem is provided where a set of scenarios $n \in \{1, \ldots, N\}$ of second stage realizations are sampled. For purposes of description, the first stage is referred to herein as the scenario n=0 (current generation capacities). The SAA problem is:

$$\min_{g,v^n,s^n} f(g) + \sum_{n=0}^{N} p^n C(s^n) \quad (4)$$

s.t. power flow balance constraints (1) for $\forall n \in \{0, \ldots, N\}$
$L_{ij}(v^n) \le \overline{l_{ij}}$  $\forall i, j \in B, n \in \{0, \ldots, N\}$
$\underline{g_i} \le g_i \le \overline{g_i}$  $\forall i \in G$
$\underline{v_i} \le |v_i^n| \le \overline{v_i}$  $\forall i \in B, n \in \{0, \ldots, N\}$. (5)

The sample probabilities $p^n$, $n=1, \ldots, N$ will depend in general on the sampling scheme used; for example, under i.i.d. sampling they are all identically $1/N$. (The first stage, i.e. n=0, is assumed to have probability $p^0=1$.) One formulation allows $s_i^0 \ne 0$ in the first-stage; however, expects typical cost curves $f_i$ and $C_i$ and available generation capacity to ensure that the first stage never purchases from the spot-market. The first stage may over-provision generator capacities $g_i$ for the first stage to handle uncertainties in the second stage, and this excess $-s_i^0(>0)$ may be sold to the spot market in the first stage.

The nonconvex optimization (4-5) can be compactly cast in a two-stage stochastic program form:

$$\min_{g,v^0,s^0} \Psi(g) \stackrel{\Delta}{=} f(g) + C(s^0) + \sum_{n=1}^{N} p^n \omega^n(g), \quad (M)$$

subject to $(g, v^0, s^0) \in \Omega$, where the feasible region $\Omega$ of the first-stage decision variables is defined by the constraints (1) and (5) associated with the first-stage (n=0). The second stage cost of for all n= 1, ..., N is:

$$\omega^n(g) = \begin{array}{l} \min_{v^n,s^n} \quad C(s^n) \\ \text{s.t.} \quad P_i(v^n) = g_i, \forall i \in G \\ \quad R^n(v^n, s^n) \le 0. \end{array} \quad (S^n)$$

The equalities arise from power balance equations (1), while the constraints $R^n(\cdot)$ include all other second-stage constraints from the original problem (4-5) that do not contain the variables g. These include power balance constraints (1) from nodes in B/G, and hence are scenario-dependent. Equalities are represented by inequalities in opposing directions. They also include other limit constraints from (5).

Two outer approximation algorithms are now provided to solve the master problem (M). The key idea is that, under certain reasonable assumptions, the recourse function $\omega^n(g)$ is convex in g even though the subproblems ($S^n$) are nonconvex. The epigraph of $\omega^n(g)$ will be iteratively approximated by an intersection of a collection of affine inequalities. This outer approximation included in the decomposition approach constructs the outer linearizations of $\omega^n(g)$ according to methods in the embodiments described herein.

In one embodiment, the approach of the method described herein uses sub-gradients of the function generated from the dual solution of the second stage subproblems ($S^n$), while the earlier approach obtains an outer cover from the optimal primal values of ($S^n$) at iterates of g.

The algorithms rely on the following two properties that have been shown to be widely shared in practical power grid balance problems:

Property 1) For every g: $\{g_i \in [\underline{g_i}, \overline{g_i}] \forall i \in G\}$, the subproblem ($S^n$) is feasible.

Property 1 says that any value of the generation power output g chosen in the first-stage admits a feasible solution for each ($S^n$) by buying (or selling) the deficiency (or surplus) of energy from (to) the spot market. In effect, the spot market has limitless capacity, either to import or export energy. This property is a reasonable assumption, for instance the "spot market" typically consists of more than one source. The method uses this assumption to avoid any second-stage feasibility checking and cut-generation part of decomposition-based algorithms, i.e., no sub-regions of the primal feasible region $\Omega$ will be cut off during the algorithm's iterations. For cutting-plane based approaches to solving non-linear problems, feasibility cuts (especially linear cuts) could prune sub-regions of the (nonconvex) domain $\Omega$ containing the global optimum, yielding only a locally optimal solution, and this eventuality is prevented.

In one aspect, P is collectively all the $\{P_i(\cdot), i \in G\}$. The set of inequality constraints $\{R^n(\cdot) \le 0\}$ in subproblem ($S^n$) is split into two sets: $R_I^n \stackrel{\Delta}{=} \{R_i^n(\cdot) \le 0, i \in I\}$ and $R_J^n \stackrel{\Delta}{=} \{R_i^n(\cdot) \le 0, i \in J\}$, where J can be empty. Call as $\Omega^n$ the feasible set $\{(v,s)|R_J^n(v,s) \le 0\}$. We can then define a Lagrangian dual function for ($S^n$) by bringing the equalities P and the first set of inequalities $R_I^n$ into the objective:

$$l^n(\lambda, \gamma) = \inf_{(v^n,s^n) \in \Omega^n} \{C(s^n) + \gamma^T P(v^n) + \lambda^T R_I^n(v^n, s^n)\}.$$

The parameters $\gamma$ and $\lambda$ are Lagrangian multipliers of the functions P and $R_I^n$ respectively. Note that the function in $l^n(\lambda, \gamma)$ is independent of the primary stage variables g. The standard Lagrangian dual formulation associated with the subproblem ($S^n$) is:

$$\max_{\lambda \ge 0, \gamma} l^n(\lambda, \gamma) - \gamma^T g. \quad (6)$$

The following property is essential to designing our decomposition technique to solve the nonconvex problem to optimality.

Property 2) For every g: $\{g_i \in [\underline{g_i}, \overline{g_i}], \forall i \in G\}$ the optimal solution of the Lagrangian dual (6) of subproblem ($S^n$) has a zero duality gap with the associated primal solution.

It is noted that subproblem ($S^n$) is a classical deterministic OPF problem. Practical electricity grids are observed to satisfy this property.

A specific reformulation of the OPF problem has been exploited to show that the zero-duality-gap condition can be checked for, and a globally optimal solution for the classical OPF problem can be recovered from this equivalent form. This condition is satisfied for a wide range of power grid test instances and it is expected that holds for most real-world power systems. One approach takes the Lagrangian function with J=Ø. A different Lagrangian dual problem has been introduced, where it has been proposed to retain simple bounds such as box and sphere constraints in the set of inequalities $R_j^n$. This gives a more efficient algorithm to find an optimum for this problem. The same zero-gap property 2 was checked from this dual problem, and was achieved for all test problems. Property 2 thus says that the subproblem (S$^n$) is expected to inherit this property.

The recourse functions $\omega^n(g)$ associated with second-stage scenarios n=1, ..., N are now characterized.

Theorem 3.1: If Property 2 holds, then $\omega^n(g)$ is convex. Furthermore, if $\gamma$ is the Lagrangian multiplier corresponding to the equality constraints $\{P(v^n)=g\}$ from the subproblem (S$^n$), then $-\gamma$ is a subgradient of $\omega^n$ at g.

This theorem 3.1 informs that the recourse function $\omega^n$ associated with the n-th subproblem (S$^n$) is convex, and its dual optimal solution at a specific master-problem value g provides a subgradient to it. This suggests that given a set of subgradients $\{\pi^{n,j}, j=1, \ldots, k\}$ of $\omega^n$, a piece-wise linear lower-approximation function $\eta^n$ can be constructed for $\omega^n$ that obeys a set of linear constraints of the form:

$$\omega^n(g^j) + (\pi^{n,j})^T(g-g^j) \leq \eta^n, \forall j=1,\ldots,k \quad (7)$$

Equation (7) is exploited to iteratively solve a sequence lower-approximation of the master problem (M):

$$\min \Psi^k(g) = f(g) + C(s^0) + \sum_{n=1,\ldots,N} p^n, \eta^n \quad (M^k)$$

s.t. $(g, v^0, s^0) \in \Omega$ and $\eta^s$ satisfies constraints of form (7), where the k-th iteration yields subgradients $\pi^{n,k}$ centered around $g^k$.

Presented in FIG. 2 is a first embodiment of a linear outer approximation algorithm 50 (Outer Approximation Algorithm 1) which includes: at 51, Setting $\eta^{n,1}=0 \forall n=1, \ldots, N$ (set of scenarios $n \in \{1, \ldots, N\}$) and Solving the following to obtain $g^1$:
min $f(g)$ such that $g(,v^0,s^0) \in \Omega$ then performing steps 52 solving the outer approximation of the master problem (M), depicted in FIG. 2 as running outer FOR loop over k iterations according to:

For k=1, 2, ...
For each n=1, ..., N:
Solving the subproblem (S$^n$) associated with $g^k$ to get the optimal value $\omega^n(g^k)$ and a subgradient $\pi^{n,k}$.
Terminating the algorithm if $\Sigma_n p^n \eta^{n,k} = \Sigma_n p^n \omega^n(g^k)$.
Solving the k-th lower-approximation (M$^k$) to the master problem to obtain an optimal solution $g^{k+1}$ and an augmented lower approximation $\eta^{n,k+1}$.

Figure 3:
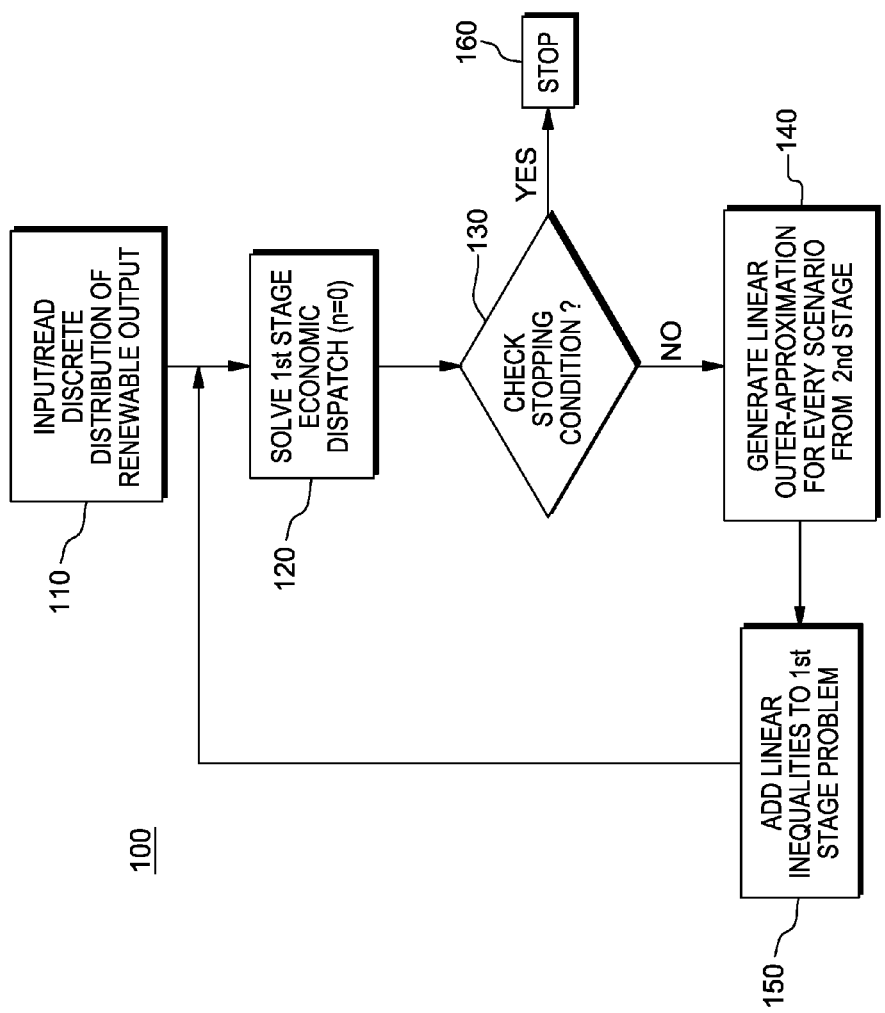
FIG. 3 depicts a flow chart of the first linear outer approximation algorithm 100 (Outer Approximation Algorithm 1) for solving the two-stage nonconvex optimization problem defined by equations (4) and (5) in two stages.

FIG. 3 depicts a flow chart of the first linear outer approximation algorithm 100 (Outer Approximation Algorithm 1) for solving the master problem (M) in two stages. As shown in FIG. 3, at 110, there is input to a programmed computing system (e.g., solver) the discrete distribution of renewable (output) power generation (eq. 1). This includes the provision (input to computer system) of the power flow equations such as governed by eq. 1), and renewable energy forecast (scenarios) for an immediate future time horizon (e.g., a next 5 minutes, 15 minutes) in the form of scenarios and related probabilities (e.g., a wattage of power generated by wind generators connected to bus, at an associated probability, e.g., 1 MW of power at probability of 0.5 for the next 5 minutes, 10 MW at probability of 0.3, for example). At 120, the computing system solves the 1st stage economic dispatch problem to determine the power generation outputs (generator capacities $g_i$) for the 1st stage (n=0). The power generation outputs obtained at step 130 are used to check for a stopping condition $\Sigma_n p^n \eta^{n,k} = \Sigma_n p^n \omega^n(g^k)$ at 130. If the stopping condition is satisfied, the process is terminated and the power generation outputs from step 120 become the solution. Results such as the generation planning results at 1st (and 2nd stages as will be described), the total expected cost, the cost from 1st stage may then be reported at 160. Otherwise, at 130, if the stopping condition is not satisfied, the process goes to 140 where the 2nd stage problems (n=1, ..., N) are solved to generate linear outer-approximation for every scenario from the 2$^{nd}$ stage. This includes setting up and solving the linear lower approximation (M$^k$) (satisfying constraints of eq. (7)) using the sub-gradients $\pi^{n,k}$ obtained from solving the subproblem (S$^n$) associated with $g^k$ to get the optimal value $\omega^n(g^k)$. As the outer approximation algorithm 1 is well-suited for parallelism, in one embodiment, the solving of the subproblem (S$^n$) may be performed in parallel, wherein the method is run fast and utilizes lower memory.

Continuing, the process proceeds to step 150, where all linear inequalities generated from 140 (constraints of eq. (7)) are added to the 1st stage problem (M$^k$)), and the process returns to 120 in order to solve the 1st stage economic dispatch problem defined by M$^k$ to determine new power generation output estimates for the 1st stage until the stopping criteria is met at step 130 after which the method terminates and outputs optimal energy generation values $g^{k+1}$ for given scenarios (See example output values in FIG. 10). The optimal energy exchanged with the spot market for each scenario is given from step 140, where the subproblem (S$^n$) is solved, e.g., in parallel.

In this first Outer Approximation Algorithm 1, at 150, an amount N new linear constraints are added per outer iteration. These are the linear inequalities generated at 140. Notice that $\eta^{n,k}$ is the approximation of $\omega^n(g^k)$ given by the k-th piece-wise-linear lower approximation from (7), and so $\Sigma_n p^n \eta^{n,k} \leq \Sigma_n p^n \omega^n(g^k)$ for every k. Thus, the algorithm terminates when the k-th master-problem (M$^k$) finds an optimal g where the lower-approximation matches the true function $\omega^n$. Each master-problem iteration (M$^k$) solves a classical optimal power flow problem augmented with a set of linear inequalities. Thus, N+1 OPF problems are being solved per outer iteration each of which can be solved efficiently using the Lagrangian-dual-based algorithms. There is also the ability to give the following convergence result for this algorithm:

Theorem 3.2: Suppose that $\{\pi^{n,k}\}$ is uniformly bounded, i.e., there exists a constant T such that $\|\pi^{n,k}\| \leq T$ for every n,k (where $\|\cdot\|$ indicates the Euclidean norm), and properties 1 and 2 hold. Then the Algorithm 1 either reaches an optimal solution in a finite number of iterations, or generates a sequence $\{g^k\}_{k=1}, \ldots$ such that:

$$\lim_{k \to \infty} \Psi(g^k) = \Psi^*,$$

where $\Psi^*$ is the optimal value of (M).

The zero duality gap property of the nonconvex second stage subproblem (S$^n$) is assistive in this algorithm. There is now described a variant of the approximation problem (M$^k$). An alternative cut can be derived by aggregating optimality cuts (7) for all scenarios:

$$\eta \overset{\Delta}{=} \sum_{n=1}^{N} p^n \eta^n \geq \sum_{n=1}^{N} \omega^n(g^j) p^n + \sum_{n=1}^{N} (\pi^{n,j})^T (g - g^j) p^n, \quad (9)$$

$$\forall \, j = 1, \ldots, k.$$

The variant ($M^{k'}$) of the lower-approximation problem ($M^k$) is obtained by replacing the variables $\{\eta^n, n=1, \ldots, N\}$ with the single variable $\eta$, and replacing the corresponding constraints (7) by constraints (9). The problem ($M^{k'}$) is also a lower-approximation of the master problem (M). The following alternate algorithm uses the variable $\eta$ and the variant ($M^{k'}$).

FIG. 4 presents a second embodiment of a linear outer approximation algorithm 150 (Outer Approximation Algorithm 2) which includes:

at 151, setting $\eta^1=0 \forall n=1, \ldots, N$ (set of scenarios $n\in\{1, \ldots, N\}$) and solve the following to get $g^1$ min $f(g)$ s.t. $(g, v^o, s^o) \in \Omega$.

then performing steps 152 solving the outer approximation of the master problem (M), depicted in FIG. 4 as running outer FOR loop over k iterations according to:

For k=1, 2, ...
   For n=1, ..., N:
      Solving the subproblem ($S^n$) associated with $g^k$ to get the optimal value $\omega^n(g^k)$ and a subgradient $\pi^{n,k}$.
      Terminating the algorithm if $\eta^k = \Sigma_n p^n \omega^n(g^k)$.
      Solving the k-th lower-approximation master problem ($M^{k'}$) to obtain an optimal solution $g^{k+1}$ and $\eta^{k+1}$.

FIG. 5 depicts a flow chart of the second linear outer approximation algorithm 200 (Outer Approximation Algorithm 2) for solving the master problem (M) in two stages. As shown in FIG. 5, at 210, there is input to a programmed computing system (e.g., solver) the discrete distribution of renewable power generation. At 220 the computing system solves the 1st stage economic dispatch problem to determine the power generation outputs for the 1st stage. The power generation outputs obtained at step 220 are used to check for a stopping condition at step 230. If the stopping condition is satisfied, the process is terminated and the power generation outputs from step 220 become the solution. Results such as the generation planning results at 1st and 2nd stages, the total expected cost, and the cost from 1st stage may then be reported at 270. Otherwise, at 230, if the stopping condition is not satisfied, the process proceeds to 240 where the 2nd stage problems ($S^n$) are solved to generate linear outer-approximation for every scenario from the $2^{nd}$ stage. As the outer approximation algorithm 2 is also well-suited for parallelism, in one embodiment, the solving of the subproblem ($S^n$) may be performed in parallel, wherein the method is run faster and utilizes lower memory in a parallel computing system. Then, the process proceeds to step 250, where all linear inequalities generated from 240 are aggregated, and at 260, the unique linear inequality is added to the 1st stage problem. That is, there is aggregated all inequalities from (5) for s in P( ) to obtain the "unique" linear inequality described in (7), i.e., only one inequality is added to the 1st stage problem per iteration in the 2nd algorithm. Then, the process returns to 220 in order to solve the 1st stage economic dispatch problem to determine new power generation output estimates for the 1st stage and the process repeats until the stopping condition is satisfied. The optimal energy exchanged with the spot market for each scenario is given from step 240, where the subproblem ($S^n$) is solved, e.g., in parallel.

The linear approximation constructed from this algorithm for the second stage recourse function in the master problem ($M^{k'}$) is slightly different from the previous one. Only one cut is added per major iteration, so its size is smaller. A convergence result akin to Theorem 3.2 holds for this algorithm.

Theorem 3.3: Suppose that $\{\pi^{n,k}\}$ is uniformly bounded, i.e., there exists a constant T such that $\|\pi^{n,k}\| \leq T$ for every n,k (where $\|\cdot\|$ indicates the Euclidean norm), and properties 1 and 2 hold. Then the Algorithm 2 either reaches an optimal solution in a finite number of iterations, or generates a sequence $\{g^k\}_{k=1,\ldots}$ such that $$\lim_{k \to \infty} \Psi(g^k) = \Psi^*,$$

where $\Psi^*$ is the optimal value of (M).

Having described algorithms to solve the sample-average approximation (4-5) of the stochastic formulation (2-3), the methods utilized Property 2 in Theorem 3.1 to show that the recourse function do that represents the second-stage problems in the master stage is convex for any realization of uncertainty. Theorems 3.2 and 3.3 state that under these conditions both algorithms that solve the SAA problem produce a limit point that is an optimal solution to the SAA program. These results also turn out to be sufficient for the sample-average approximation to produce consistent estimates of the stochastic formulation (2-3):

Theorem 3.4: Let $\vartheta^*$ and $\vartheta_N$ be the optimal objective values to the stochastic formulation (2-3) and its N-sample approximation (4-5). Similarly, Let S and $S_N$ be the set of optimal solutions of the two problems. If i) the feasible set $\Omega$ of the first-stage program (M) is closed and convex, ii) the expected value function $E_\xi[\omega^\xi(\,)]$ is lower semicontinuous and is finite for some $(g, v^o, s^o) \in \Omega$, and iii) the LLN holds pointwise: $\Sigma_N \omega^N(g)/N \to E_\xi \omega^\xi(g)$, then $$\vartheta_N \to \vartheta^* \text{ and } d(S_N, S) \to 0 \text{ w.p. 1 as } N \to 0,$$

where $d(\cdot, \cdot)$ denotes the Haussdorf set deviation metric. Note that Theorem 3.2 states that the sets $S_N$ are non-empty.

A further alternative approach to decomposing the large-scale program defined by the SAA problem (4-5) into smaller subproblems is provided. This approach includes reformulating the original problem to apply the Alternating Direction Method of Multipliers (ADMM) to derive the algorithm described herein. ADMM belongs to a class of first-order primal dual algorithms that updates both primal and dual variables at each iteration.

A general ADMM approach is now described: first, includes considering the general optimization problem with a block separable structure $$\min_{x,y} \{F(x) + G(y): Ax + By = d, x \in X, y \in Y\}, \quad (10)$$

where $X \subset P^n$, $Y \subset P^m$, $A \in P^{p \times n}$, $B \in P^{p \times m}$ and $d \in P^p$. One embodiment assumes that F and G are closed, proper, convex and differentiable. Forming the augmented Lagrangian:

$$L_\beta(x, y, \lambda) = F(x) + G(y) + \lambda^T(Ax + By - d) + \frac{1}{2}\beta\|Ax + By - d\|^2, \quad (11)$$

where $\beta>0$. The classical augmented Lagrangian multiplier method involves a joint optimization and a multiplier update step:

$$(x^{k+1},y^{k+1})=\text{"argmin"}_{x\in X, y\in Y}L_\beta(x,y;\lambda^k)$$

$$\lambda^{k+1}=\lambda^k+\beta(Ax^{k+1}+By^{k+1}-d).$$

In solving the first optimization problem, the alternating direction method of multipliers consists of the iterations $$x^{k+1}=\text{"argmin"}_{x\in X}L_\beta(x,y^k;\lambda^k)$$

$$y^{k+1}=\text{"argmin"}_{y\in Y}L_\beta(x^{k+1},y;\lambda^k)$$

$$\lambda^{k+1}=\lambda^k+\beta(Ax^{k+1}By^{k+1}-d). \quad (12)$$

In adapting the approach (12) to the classical OPF problem, the power grid is split into a number of separate regions and the variables representing new power flow duplicated in the overlap between regions. This allows each region to solve its subproblem and hence solve the OPF in a distributed fashion. It can be shown how the method is applied to solve for (4-5). Observe that the optimization problem (4-5) can be reformulated by introducing auxiliary variables $g^n=\{g_i^n, i\in G\}$, $n=0, 1, \ldots, N$ in a form suitable for ADMM (recall that $n=0$ represents the first stage):

$$\min f(g^0) + \sum_{n=0}^{N} p^n C(s^n) \quad (13)$$

$$\text{subject to } P_i(v^n) = \begin{cases} s_i^n & \forall i \in S \\ g_i^n & \forall i \in G \\ W_i^n & \forall i \in W \\ -D_i & \forall i \in D \end{cases}, n = 0, 1, \ldots, N \quad (14)$$

$$L_{ij}(v^n) \le \overline{L_{ij}} \quad \forall i,j \in B \quad (15)$$
$$\underline{g_i} \le g_i^n \le \overline{g_i} \quad \forall i \in G$$
$$\underline{v_i} \le |v_i^n| \le \overline{v_i} \quad \forall i \in B$$
$$g^n = g^0 \quad n = 1, \ldots, N$$

Constraints (15) are brought into the objective in creating the following Lagrangian function for this re-formulation:

$$L_\beta((g^0, v^0, s^0, \lambda^0), \ldots, (g^N, v^N, s^N, \lambda^N)) =$$
$$f(g^0) + \sum_{n=0}^{N}\left(p^n C(s^n) + (\lambda^n)^T(g^0 - g^n) + \frac{\beta}{2}\|g^0 - g^n\|^2\right).$$

By applying (12) at each iteration, the original problem may be decomposed into N+1 subproblems and each scenario solved independently, where each scenario in turn solves a classical OPF formulation, just as in the decomposition Algorithms 1 and 2 presented herein above.

Presented in FIG. 6 is a further embodiment of a linear outer approximation algorithm 250 implementing an ADMM approximation which includes:

at 251, setting and initializing

Initialize $g^{n,0}$, $\lambda^{n,0}$, n=1, ..., N then performing steps 252, which may be performed in parallel computing implementation:

For k = 1, 2, ...

Set $(g^{0,k}, v^{0,k}, s^{0,k}) =$ (a)

$$\text{"argmin"} \quad f(g) + C(s) + \sum_{n=1}^{N}\left((\lambda^{n,k-1})^T(g - g^{n,k-1}) + \frac{\beta}{2}\|g - g^{n,k-1}\|^2\right)$$
$$\text{s.t.} \quad (g, v, s) \text{ obey } eq. (14) \text{ for } n = 0$$

For $n = 1, \ldots, N$: $(g^{n,k}, v^{n,k}, s^{n,k}) =$ (b)

$$\text{"argmin"} \quad p^n C(s) + (\lambda^{n,k-1})^T(g^{0,k} - g) + \frac{\beta}{2}\|g^{0,k} - g\|^2$$
$$\text{s.t.} \quad (g, v, s) \text{ obey } eq. (14) \text{ for } n$$

Set $\lambda^{n,k} = \lambda^{n,k-1} + \beta(g^{n,k} - g^{0,k})$ (c)

Terminate if $\|g^{n,k+1} - g^{0,k+1}\| \le \varepsilon$ and $\|g^{n,k+1} - g^{n,k}\| \le \varepsilon$, (d)
$$n = 1, \ldots, N.$$

The stopping criterion used in Step (d) above is popular in ADMM implementations.

FIG. 7 depicts a flow chart of the ADMM approximation algorithm 300 for solving the master problem (M). As shown in FIG. 6, at 310, there is input to a programmed computing system (e.g., solver) the discrete distribution of renewable power generation. At 320 the computing system forms the Lagrangian $L_\beta((g^0,v^0,s^0,\lambda^0), \ldots, (g^N,v^N,s^N,\lambda^N))$ of the above reformulated problem (see equations 13)-15)). From the Lagrangian there if defined the objective functions in the FOR loop processing of the ADMM algorithm shown in FIG. 6. Then, at 330, there is performed the initializing of the multipliers and 2$^{nd}$ stage decision variables corresponding to step 251. At 340 there is performed solving the 1st stage economic dispatch problem to determine the power generation outputs for the 1st stage, and, at 350, solving the 2nd stage problems, e.g., in parallel. The process further includes at 360 updating the $\lambda$ multipliers, and at 370 checking for a stopping condition. If the stopping condition is satisfied, the process is terminated at 380. Otherwise, the process returns to step 340 to again iterate through the ADMM solution technique until such stopping condition is satisfied.

The following test power systems were used to run the algorithms described herein. Their characteristics are summarized in the Table 400 depicted in FIG. 8:

CH9: the 9 bus example

NE39: the New England system

IEEE14, IEEE30, IEEE57, IEEE118 and IEEE300

The first column of the test system characteristics Table 400 in FIG. 8 shows the abbreviations of the systems, while the second and third columns show the total number of buses and the number of generators in each system. The fourth column reports the number of lines interconnecting the buses. As shown, two sources of renewable generation were added, and their associated nodes chosen, and those of the spot market locations, as presented in the remaining columns. The algorithms were coded in Matlab and experiments were carried out on a PC using Matlab 7.10 with an Intel Xeon X5570 2.93 GHz under the Linux operating system. The termination (error tolerance) criteria of the algorithms was ($\varepsilon=10^{-3}$. In particular, the following equation was used:

(Algorithm 1)

$$\sum_n (\omega^n(g^{k+1}) - \eta^{n,k+1})p^n \le \varepsilon \text{ and} \quad (16)$$

(Algorithm 2)

$$\sum_n \omega^n(g^{k+1})p^n - \eta^{k+1} \le \varepsilon. \quad (17)$$

In numerical experiments conducted, the cost function $f_i$ is assumed convex quadratic, and the spot market costs $C_i(s_i)$ are convex quadratic over $s_i > 0$ and linear over $s_i < 0$. The mean power output of the first wind generator is set at 70% of the average of the upper limits $\bar{g}s$ of the capacity of all conventional generators for the first wind generator. The second generator's mean was sampled uniformly around the first's mean within up to a 30% change. The cost coefficients for the imported-energy function $C_i(s_i), (s_i > 0)$ were randomly chosen from 1.5 to 2.0 times higher than the largest coefficients of the generation cost function $f_i$, i.e., higher prices than our own generation cost are incurred if the energy has to be purchased from the spot market. Meanwhile, the coefficients of the cost of exported energy function $C_i(s_i), (s_i < 0)$ were taken to be 0.5 to 0.7 times related to the smallest linear coefficients of the $f_i$. The second stage scenarios were sampled uniformly with renewable generation varying up to 20% from their mean, which also represents their first-stage realized generation. In this manner, 20 scenarios of wind power outputs were chosen for each experimental run. The performance of algorithms including CPU time in seconds is depicted in the table 500 of FIG. 9.

Table 500 shows that the outer-approximation algorithms converge quickly to the optima, requiring from 2 to 7 iterations to satisfy the error tolerance. In most cases, the two algorithms used the same number of iterations to solve the problem. For these cases, the running time for Algorithm 2 is observed to be less than those of Algorithm 1. The sole exception is the IEEE 57 bus test system, for which Algorithm 2 requires more iterations, and as a result more computational time. Since the outer-approximation provided by the individual linear cuts from Algorithm 1 provides a tighter bound to $\omega''(\cdot)$, the required iterations never exceed those of Algorithm 2. On the other hand, Algorithm 2 uses fewer linear functions to provide the outer-approximation, and hence solvers take less time solving them. Finally, the ADMM approach requires an order of magnitude more iterations and CPU time, but still scales well with the size of problems.

In an example problem FIG. 10 shows an output listing of an example solution 450 of the generation planning and exchange of powers via spot market scenarios for an example CH9 bus configuration. Input data for solving optimization problem defined by equations (4) and (5) includes the current generator capacities (including conventional and renewable energy sources), the number of scenarios (renewable energy availability forecasts such as wind power), the bus locations of spot market import/export, bus locations of renewable generators (i.e. wind power injection) etc. Based on the above-identified problem (e.g., 10 scenario problem) the objective is to minimize the total aggregated expected cost by determining the optimal output values for g, $v''$,$s''$ in the two-stage formulation described herein above. Thus, from solving the $1^{st}$ stage energy dispatch portion of optimization problem (M) with approximated solution, there is obtained the current generation values and expected costs 460, e.g., for three generators. Solving the $2^{nd}$ stage optimization problem $S''$ there is obtained the amount of power needed to be bought or sold on the spot market depending upon the scenario. For example, the output obtained by solving the $S''$ sample-average approximation for second stage cost for each scenario is by minimizing $v''$, $s''$. For example, as shown in FIG. 10, based on computed solutions to sub-problems $S''$, the output informs that there needs to be energy imported (e.g. via inputs at busses 2, 3) in Scenario 1 475 as very low renewable energy is generated; however, based on computed solutions to sub-problems $S''$, the output informs that there can be energy exported in Scenario 2 480 as larger amounts of renewable energy is expected to be generated via the next future time interval (e.g., 5 minutes to 15 minutes). FIG. 10 provides expected imports/exports values for each example scenario obtained by solving the sub-problems $S''$.

FIG. 11 illustrates an exemplary hardware configuration of the computing system 600. The hardware configuration preferably has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting the system 600 to a data processing network, the Internet, an Intranet, a local area network (LAN), etc., and a display adapter 636 for connecting the bus 612 to a display device 638 and/or printer 639 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A system for determining a generator dispatch plan for a power grid under uncertain conditions comprising:
    a memory storage device;
    a processor coupled to the memory device, the processor configured to:
    receive data modeling power flow of active generation units over nodes of a power grid network of multiple local buses interconnected via alternating current transmission lines, said active generation units including conventional energy generators producing energy;
    receive during a first time interval data of a set of forecast scenario modeling uncertainty in renewable energy output, said set capturing a finite number of scenarios generation for an immediately successive 2nd time interval;
    formulate a nonconvex optimization problem modeling an economic dispatch problem under renewable-generation uncertainty using said finite number of scenarios;
    solve said nonconvex optimization problem during said first time interval to obtain power dispatch levels for said generators and energy levels exchanging with a spot market for each scenario at said immediately successive 2nd time interval that minimizes expected cost of power generation and cost of exchanging energy with a spot market modeled for each said modeled uncertainty, wherein to solve said nonconvex optimization problem includes solving a two-stage minimization problem by: decomposing said non-convex optimization problem based on an iterative outer approximation technique, said decomposing including solving a sequence of lower-approximation problems for a first-stage minimization problem with each iteration improving a piecewise-linear outer-approximation for a recourse function that represents the second time interval stage costs of the spot market access.

2. The system of claim 1 wherein said processor device is further configured to solve said nonconvex optimization problem to determine:
    optimal power output levels of said active generators and energy levels exchanging with a spot market for each scenario, and
    how the produced energy is routed through the grid to consumption nodes, such that an expected cost for energy generation and spot market access is minimized.

3. The system of claim 1 wherein to solve said two-stage minimization problem, said processor device is further configured to minimize said optimization function subject to Alternating Current power balance operational constraints at said first time interval to obtain optimal energy dispatch levels of active generation units and energy levels exchanging with a spot market for each scenario for said immediate successive second time interval.

4. The system of claim 3 wherein to decompose said nonconvex optimization problem based on said iterative outer approximation technique, said processor device is further configured to:

construct said piecewise-linear outer-approximation of the recourse function by iteratively approximating an intersection of a collection of affine inequalities.

5. The system of claim 3, wherein to solve said sequence of lower-approximation problems, said processor device is further configured to implement a second stage solution comprising:

iteratively solving, for each renewable energy generation scenario, n=1, ..., N, a subproblem (S") associated with said optimal energy levels exchanging with a spot market for each scenario during said immediate successive second time interval; and iterative solving the k-th lower-approximation to said optimization problem to obtain an optimal solution and an augmented lower approximation.

6. The system of claim 5 wherein said processor device is further configured to, in said $2^{nd}$ stage solution, add all linear inequalities generated from solving optimization problem as new constraints to the 1st stage problem for solving at a next outer-approximation iteration.

7. The system of claim 5 wherein said processor device is further configured to, in $2^{nd}$ stage solution, aggregate all linear inequalities from solving optimization problem, and adding a single unique linear inequality as a new constraint to the 1st stage problem for solving at a next outer-approximation iteration.

8. The system of claim 5 wherein said optimal energy dispatch levels includes optimal energy level exchanged with a spot market for each said scenario.

9. The system of claim 5 wherein said processor device is further configured to obtain subgradients of the optimization function generated from the solution of the second stage subproblems (S").

10. The system of claim 1 wherein said processor device is further configured to decompose nonconvex sample-average approximation problem by alternating direction method of multipliers approach.

11. The system of claim 1, wherein said optimization problem modeling of said economic dispatch problem receives input data comprising: a network topology, branch and nodal admittance matrices, voltage limits on every node, thermal limits on every branch, and real power and reactive power generation limits.

12. The system of claim 1, wherein said nonconvex optimization problem to be minimized is a function $\Psi(g)$ modeled according to:

$$\min_{g,v^0,s^0} \Psi(g) \triangleq f(g) + C(s^0) + \sum_{n=1}^{N} p^n \omega^n(g), \text{ subject to } (g, v^0, s^0) \in \Omega,$$

where $f(g)$ represents a cost of generation for a conventional generator g, n is a set of scenarios where n= 1, ..., N, $C(s^0)$ is the cost of purchasing energy from or selling energy to the spot market in a first stage (n=0), $p^n$ is a sample probability where n=1, ..., N, $\omega^n(g)$ is a recourse function associated with a second-stage scenario n, $\Omega$ represents a feasible region of first-stage decision variables defined by constraints associated with said first-stage (n=0), said constraints including $$P_i(v^\xi) = \begin{cases} s_i^\xi & \forall\, i \in S \\ g_i & \forall\, i \in G \\ W_i^\xi & \forall\, i \in W \\ -D_i & \forall\, i \in D \end{cases}$$

where i is an index of nodes, $P_i(\bullet)$ represents one or more power-flow functions at a node i, variable $v^\xi$ represents a vector of all voltages within limits $[\underline{v}, \overline{v}]$ and $\xi$ represents a second-stage uncertainty realization, W is a set of wind-generator nodes and $W_i^\xi$ is a level of wind turbine power extraction at node i∈W, G is a set of nodes connected to conventional generators with $g_i$ being complex power generated at node i where i∈G and wherein said generators are limited to producing within limits $[\underline{g_i}, \overline{g_i}]$, D is a set of energy demand or load on nodes with $-D_i$ being a demand at node i∈D, and S is a set of nodes having access to the spot market, and $s_i^\xi$ is power procured from the spot market at node i∈S or surplus power at node i∈S under realization $\xi$, and $$L_{ij}(v^n) \le \overline{l_{ij}} \quad \forall\, i,j \in B, n \in \{0, \ldots, N\}$$

$$\underline{g_i} \le g_i \le \overline{g_i} \quad \forall\, i \in G$$

$$\underline{v_i} \le |v_i^n| \le \overline{v_i} \quad \forall\, i \in B, n \in \{0, \ldots, N\}.$$

where $L_{ij}(v^n)$ is a power transmission obeying a transmission line limit $\overline{l_{ij}}$ where i and j are two connected nodes, and B is a set of all busses or nodes in a grid network.

13. A computer program product for determining a generator dispatch plan for a power grid under uncertain conditions, the computer program product comprising a non-transitory computer readable storage medium, the non-transitory computer readable storage medium readable by a processing circuit and storing instructions run by the processing circuit for performing a method, said method comprising:

receiving data modeling power flow of active generation units over nodes of a power grid network of multiple local buses interconnected via alternating current transmission lines, said active generation units including conventional energy generators producing energy;

receiving during a first time interval data of a set of forecast scenario modeling uncertainty in renewable energy output, said set capturing a finite number of scenarios generation for an immediately successive 2nd time interval;

formulate a nonconvex optimization problem modeling an economic dispatch problem under renewable-generation uncertainty using said finite number of scenarios;

solving said nonconvex optimization problem during said first time interval to obtain power dispatch levels for said generators and energy levels exchanging with a spot market for each scenario at said immediately successive 2nd time interval that minimizes expected cost of power generation and cost of exchanging energy with a spot market modeled for each said modeled uncertainty, wherein said solving includes solving a two-stage minimization problem by: decomposing said non-convex optimization problem based on an iterative outer approximation technique, said decomposing including solving a sequence of lower-approximation problems for a first-stage minimization problem with each iteration improving a piecewise-linear outer-approximation for a recourse function that represents the second time interval stage costs of the spot market access.

14. The computer program product of claim 13, said method further solving said nonconvex optimization problem to determine:
   optimal power output levels of said active generators and energy levels exchanging with a spot market for each scenario, and
   how the produced energy is routed through the grid to consumption nodes, such that an expected cost for energy generation and spot market access is minimized.

15. The computer program product of claim 13, wherein said two-stage minimization problem minimizes said optimization function subject to Alternating Current power balance operational constraints at said first time interval to obtain optimal energy dispatch levels of active generation units and energy levels exchanging with a spot market for each scenario for said immediate successive second time interval.

16. The computer program product of claim 15 wherein said iterative outer approximation technique comprises:
   constructing said piecewise-linear outer-approximation of the recourse function by iteratively approximating an intersection of a collection of affine inequalities.

17. The computer program product of claim 13, wherein said solving said sequence of lower-approximation includes a second stage solution comprising:
   iteratively solving, for each renewable energy generation scenario, n=1, ..., N, a subproblem ($S^n$) associated with said optimal energy levels exchanging with a spot market for each scenario during said immediate successive second time interval; and
   iterative solving the k-th lower-approximation to said optimization problem to obtain an optimal solution and an augmented lower approximation.

18. The computer program product of claim 17 said method further comprising: in said $2^{nd}$ stage solution, adding all linear inequalities generated from solving optimization problem as new constraints to the 1st stage problem for solving at a next outer-approximation iteration.

* * * * *